United States Patent
Lee et al.

(10) Patent No.: US 9,773,305 B2
(45) Date of Patent: Sep. 26, 2017

(54) LESION DIAGNOSIS APPARATUS AND METHOD

(71) Applicant: Samsung Electronics Co., Ltd., Suwon-si (KR)

(72) Inventors: Jae-Cheol Lee, Seoul (KR); Kyoung-Gu Woo, Seoul (KR); Yeong-Kyeong Seong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 14/151,168

(22) Filed: Jan. 9, 2014

(65) Prior Publication Data
US 2014/0193051 A1 Jul. 10, 2014

(30) Foreign Application Priority Data
Jan. 10, 2013 (KR) .................. 10-2013-0002993

(51) Int. Cl.
*G06K 9/00* (2006.01)
*G06T 7/00* (2017.01)

(52) U.S. Cl.
CPC .. *G06T 7/0012* (2013.01); *G06T 2207/10016* (2013.01); *G06T 2207/10132* (2013.01); *G06T 2207/20076* (2013.01); *G06T 2207/20081* (2013.01); *G06T 2207/30096* (2013.01)

(58) Field of Classification Search
None
See application file for complete search history.

(56) References Cited

U.S. PATENT DOCUMENTS

| | | | | |
|---|---|---|---|---|
| 5,799,100 | A * | 8/1998 | Clarke | G06T 7/0012 382/132 |
| 6,058,322 | A * | 5/2000 | Nishikawa | G06T 7/0012 128/925 |
| 6,078,680 | A * | 6/2000 | Yoshida | G06T 7/0012 382/128 |
| 6,179,780 | B1 * | 1/2001 | Hossack | G01S 7/5209 600/437 |
| 6,640,001 | B2 * | 10/2003 | Roehrig | G06K 9/00 382/128 |
| 6,674,880 | B1 * | 1/2004 | Stork | G06T 7/0012 382/128 |
| 7,218,766 | B2 * | 5/2007 | Eberhard | A61B 6/463 128/922 |
| 7,639,848 | B2 * | 12/2009 | Qian | A61B 6/00 382/128 |
| 9,092,691 | B1 * | 7/2015 | Beaumont | G06T 7/0014 |

(Continued)

FOREIGN PATENT DOCUMENTS

| | | |
|---|---|---|
| JP | 2003-339644 A | 12/2003 |
| KR | 10-2010-0065194 A | 6/2010 |

(Continued)

*Primary Examiner* — Iman K Kholdebarin
(74) *Attorney, Agent, or Firm* — Jefferson IP Law, LLP

(57) ABSTRACT

A lesion diagnosis apparatus and a lesion diagnosis method are provided. A lesion-surrounding area determination unit is configured to determine an existence of a lesion-surrounding area from continuous medical images. A feedback provision unit is configured to generate feedback information about a presence of a lesion in the lesion-surrounding area.

25 Claims, 8 Drawing Sheets

(56) References Cited

U.S. PATENT DOCUMENTS

| | | | |
|---|---|---|---|
| 2003/0031993 A1* | 2/2003 | Pugh | G09B 23/30 434/262 |
| 2003/0065260 A1* | 4/2003 | Cheng | A61B 8/0833 600/427 |
| 2004/0097805 A1 | 5/2004 | Verard et al. | |
| 2006/0111705 A1* | 5/2006 | Janzen | A61B 18/1477 606/41 |
| 2006/0274928 A1* | 12/2006 | Collins | A61B 6/00 382/132 |
| 2007/0016022 A1* | 1/2007 | Blalock | G01S 7/52085 600/437 |
| 2007/0043341 A1* | 2/2007 | Anderson | A61B 5/0059 606/12 |
| 2007/0238998 A1* | 10/2007 | Nycz | A61B 8/0875 600/437 |
| 2009/0080765 A1* | 3/2009 | Bernard | G06T 11/006 382/154 |
| 2009/0132916 A1* | 5/2009 | Filatov | G06F 19/3406 715/700 |
| 2010/0250275 A1 | 9/2010 | Sakagawa et al. | |
| 2011/0058721 A1* | 3/2011 | Zhang | A61B 5/08 382/131 |
| 2011/0075920 A1* | 3/2011 | Wu | G06K 9/4638 382/160 |
| 2011/0085715 A1 | 4/2011 | Yan et al. | |
| 2011/0160587 A1* | 6/2011 | Nycz | A61B 8/0875 600/443 |
| 2012/0041290 A1* | 2/2012 | Perelman | A61B 5/0062 600/326 |
| 2012/0093383 A1* | 4/2012 | Claus | A61B 6/032 382/131 |
| 2012/0123253 A1* | 5/2012 | Renisch | A61B 6/5217 600/425 |
| 2012/0150039 A1 | 6/2012 | Liu et al. | |
| 2012/0189176 A1* | 7/2012 | Giger | G06K 9/6253 382/128 |
| 2012/0243757 A1* | 9/2012 | Funka-Lea | G06T 7/0002 382/131 |
| 2013/0121546 A1* | 5/2013 | Guissin | G06T 7/0012 382/128 |
| 2013/0301889 A1* | 11/2013 | Abramoff | G06K 9/00 382/128 |
| 2016/0239969 A1* | 8/2016 | Davatzikos | G06T 7/003 |

FOREIGN PATENT DOCUMENTS

| | | |
|---|---|---|
| KR | 10-2011-0040736 A | 4/2011 |
| KR | 10-2011-0091828 A | 8/2011 |
| WO | WO 2006/042201 A1 | 4/2006 |

* cited by examiner

LESION DIAGNOSIS APPARATUS AND METHOD

CROSS-REFERENCE TO RELATED APPLICATION

This application claims the benefit under 35 U.S.C. §119 (a) of Korean Patent Application No. 10-2013-0002993, filed on Jan. 10, 2013, in the Korean Intellectual Property Office, the entire disclosure of which is incorporated herein by reference for all purposes.

BACKGROUND

1. Field

The following description relates to a lesion diagnosis apparatus and method.

2. Description of the Related Art

Computer Aided Diagnosis (CAD) is a diagnosis technique to diagnose a lesion by detecting a lesion, extracting a feature of the lesion, and classifying the feature by analyzing medical images received from an ultrasonic probe. Thus, it is important to quickly receive a medical image containing a lesion to quickly and precisely diagnose the lesion.

An ultrasound imaging device scans a lesion from a medical image using a probe, captures a suspected area that contains the lesion as a still image, and stores the captured image in a Picture Archiving and Communication System (PACS). A CAD apparatus receives the image stored in the PACS and diagnoses the lesion from the image through a lesion detection, a feature extraction, and a feature classification. However, if there is a portion of the medical image that was not captured as a still image using the probe, the CAD apparatus cannot diagnose the lesion from the area, and thus, a physician or medical technician may fail to recognize that a lesion exists in the area.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a lesion diagnosis apparatus including a lesion-surrounding area determination unit configured to determine an existence of a lesion-surrounding area from continuous medical images; and a feedback provision unit configured to generate feedback information about a presence of a lesion in the lesion-surrounding area.

The apparatus may further include the lesion-surrounding area determination unit determining the existence of the lesion-surrounding area from each of the continuous medical images. The lesion-surrounding area determination unit may determine the lesion-surrounding area from the continuous medical images using a discriminant model.

The apparatus may further include the discriminant model to be generated by learning at least one of anatomical features and image features of a previously collected lesion-surrounding area.

The apparatus may also include the lesion-surrounding area determination unit determining whether there is a lesion-surrounding area by analyzing each frame of the continuously-received medical images or by sampling each of the continuously-received medical images every number of frames according to a selection of a user or a processing performance.

The apparatus may include the lesion-surrounding area determination unit determining a possibility of a presence of a lesion as a numerical value by comparing a brightness variation of each medical image of the continuous medical images against the discriminant model.

The apparatus may include the lesion-surrounding area determination unit determining a possibility of a presence of the lesion in the lesion-surrounding area from the continuous medical images according to a measured location of a medical image, and the feedback provision unit generating an image indicating the possibility of the presence of the lesion according to the location of the medical image.

The feedback provision unit may generate, based on the possibility of the presence of the lesion, the image indicating a direction in which the lesion is likely to be present. The feedback provision unit may generate, based on the possibility of the presence of the lesion, the image in the form of probability map indicating the possibility of the presence of the lesion. The feedback provision unit may generate at least one of a visual signal, an audio signal, and a tactile signal to guide a measuring device toward a direction in which the lesion is likely to be present.

The apparatus may further include the lesion diagnosis apparatus including a diagnosis unit configured to diagnose the lesion from each of the continuous medical images; and a storage unit configured to store at least one of location information, features, and diagnosis of the lesion diagnosed. The feedback provision unit further generates the feedback information to output the diagnosis of the diagnosed lesion.

The feedback provision unit may further generate, based on at least one of the location information, the features, and the diagnosis, visual information to notify that the lesion has been diagnosed.

The diagnosis unit may diagnose, based on at least one of the location information and the features, an undiagnosed lesion. The diagnosis unit may be configured to diagnose in real-time by detecting a lesion from at least one of or each of the continuously-received medical images, extracting features from the detected lesion, and classifying the detected lesion. The diagnosis unit may diagnose the lesion based on all frames of each of the continuous medical images or based on sampling the continuously-received medical images at predefined number of frames. The diagnosis unit may determine whether the lesion is identical to a previously diagnosed lesion based on at least one of a relative location or absolute coordinates of location information of the lesion, and features of the lesion.

The apparatus may further include, when the diagnosis unit determines that the lesion is identical to a previously diagnosed lesion, the diagnosis unit excludes diagnosing the lesion, wherein the features of the lesion comprise a boundary shape and boundary sharpness, and an echo pattern and posterior acoustic shadow.

In accordance with an illustrative example, there is provided a lesion diagnosis method including receiving continuous medical images; determining an existence of a lesion-surrounding area from the continuous medical images; and generating feedback information about a presence of a lesion in the lesion-surrounding area.

The method may also include determining of the existence of the lesion-surrounding area may be from each of the continuous medical images. The determining may include determining the lesion-surrounding area using a discriminant model.

The method also may include generating the discriminant model by learning at least one of anatomical features and image features of a previously collected lesion-surrounding area.

The method may further include determining a possibility of a presence of the lesion in the lesion-surrounding area from the continuous medical images according to a measured location of a medical image, and the generating may include generating an image indicating a possibility of the presence of the lesion according to the location of the medical image.

The method may further include the generating, based on the possibility of the presence of the lesion, generating the image indicating a direction in which the lesion is likely to be present.

The generating may include, based on the possibility of the presence of the lesion, generating the image in a form of probability map indicating the possibility of the presence of the lesion.

The generating may also include, based on the possibility of a presence of a lesion, generating at least one of a visual signal, an audio signal, and a tactile signal to guide a measuring device toward a direction in which the lesion is likely to be present.

The method may also includes diagnosing the lesion from each of the continuous medical images; storing at least one of location information, features and diagnosis of the diagnosed lesion; and generating the feedback information to output the diagnosis of the diagnosed lesion.

The generating of the feedback information may further include, based on at least one of the location information and the features, generating visual information to notify that the lesion has been diagnosed.

The diagnosing of a lesion may include, based on at least one of the location information and the features, an undiagnosed a lesion.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
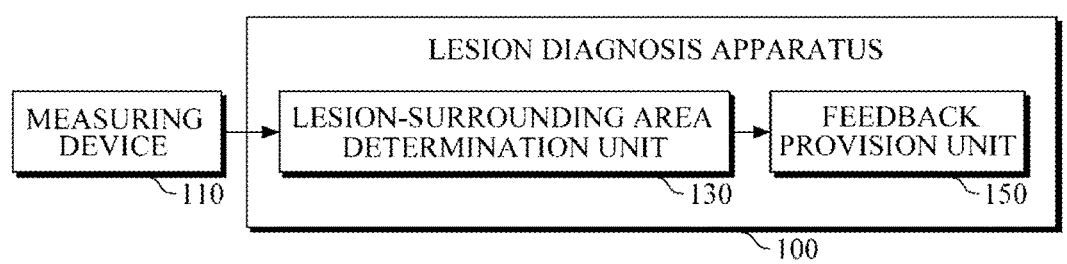
FIGS. 1 and 2 are diagrams illustrating a configuration of a lesion diagnosis apparatus, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 2:
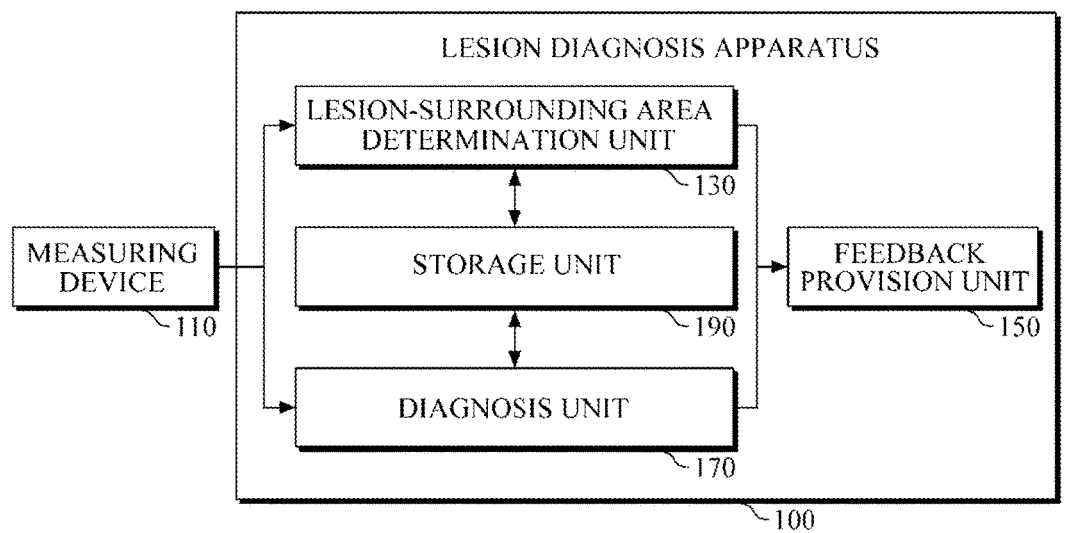

FIGS. 1 and 2 are diagrams illustrating a configuration of a lesion diagnosis apparatus, according to an embodiment.

Referring to FIG. 1, a lesion diagnosis apparatus 100 includes a lesion-surrounding area determination unit 130 and a feedback provision unit 150.

A measuring device 110 generates continuous medical images by measuring a body organ or part of a subject such as a patient including a person or an animal. The measuring device 110 may be a probe that a user moves along a surface of a patient's body part for measurement. However, aspects of the various embodiments are not limited thereto, and the measuring device 110 may include any type of probe capable of moving automatically without a user's intervention or capable of being manipulated by the user from a remote distance.

A medical image generated by the measuring device 110 may be an ultrasound image. However, the medical image may include any type of medical image that may be used to diagnose a lesion.

In addition, the measuring device 110 may generate continuous medical images in real-time. For example, if the user moves the measuring device 110 along a surface of a patient's body part, corresponding medical images are generated in real-time. In a case that an ultrasound image is measured by an ultrasonic probe, to obtain a digital image, the probe would transmit an ultrasound signal to the patient's body part, receives as feedback an ultrasound echo signal reflected from the patient's body part, and then converts the ultrasound echo signal into an electronic signal. In addition, when the user moves the probe along a surface of a patient's body part, continuous ultrasound images may be generated in real-time as the medical images. The medical images may be two-dimensional images or three-dimensional images. In one example, the measuring device 110 includes at least one of an accelerometer, a pressure sensor, and a tilt sensor. The sensors described above may be installed internally or externally the measuring device 110. Also, a medical image generated by the measuring device 110 is provided to the user via a display device in real-time.

The measuring device 110 transmits continuously the medical images to the lesion-surrounding area determination unit 130. The lesion-surrounding area determination unit 130 determines whether a lesion-surrounding area exists in at least one, each, or some of the continuous medical images received from the measuring device 110. In one embodiment, the lesion-surrounding area determination unit 130 determines whether the lesion-surrounding area exists in a currently received medical image based on at least one of anatomical features and image features of the currently received medical image. In one example, the anatomical features include skin, fat, and breast parenchyma. In addition, the image features may include an image feature that is determined based on a distance from a lesion. For example, the image feature may be variation in brightness of an image according to distance from a lesion. In an alternative configuration, the image feature may include other types of features that are found largely in an area surrounding a lesion.

As another example, the lesion-surrounding area determination unit 130 determines whether there is a lesion-surrounding area using a discriminant model, which is previously generated and stored. The discriminant model is generated by learning at least one of anatomical features and image features of a lesion-surrounding area from a previously collected medical image. For example, a discriminant model may be generated based on a condition in which the more distant a lesion-surrounding area is from the lesion, the darker the lesion-surrounding area becomes. In other words, the discriminant model may be generated by dividing a previously collected lesion-surrounding area into parts according to distance from a lesion, collecting data about brightness variation between the divided parts, and learning the collected data. However, aspects of the various embodiments are not limited thereto, and a discriminant model may be generated by using various types of information that may be found nearby a lesion.

As another example, the lesion-surrounding area determination unit 130 determines a probability of a presence of a lesion according to a measured location of a received medical image. That is, using a pre-generated discriminant model, the lesion-surrounding area determination unit 130 determines a probability of a lesion present nearby a location at which a currently received medical image is measured. For example, when using a discriminant model that is generated using brightness of an area surrounding a lesion, the probability that the lesion is present is obtained as a numerical value by comparing a brightness variation of a currently received medical image against the brightness of the discriminant model. As an example, the lesion-surrounding area determination unit 130 determines whether there is a lesion-surrounding area by analyzing at least one, each, or some of the frames of the continuously-received medical images.

As another example, the lesion-surrounding area determination unit 130 determines whether there is a lesion-surrounding area by sampling at least one, each, or some of the continuously-received medical images every predetermined number of frames according to a selection of a user or a predefined processing performance.

The feedback provision unit 150 generates feedback information indicative of whether the lesion-surrounding area determination unit 130 determined the existence of a lesion-surrounding area. For example, the feedback provision unit 150 generates or produces an image indicating a possibility of a presence of a lesion according to a measured location of at least one of the continuously-received medical images. For example, an image that indicates a possibility of a presence of a lesion is generated in the form of probability map. However, aspects of the various embodiments are not limited thereto, and an image indicating a possibility of a presence of a lesion may include images in various forms.

As another example, based on the possibility of a presence of a lesion determined by the lesion surrounding determination unit 130, the feedback provision unit 150 generates an image that indicates a direction in which a lesion is highly likely to be present at a measured location of a currently received medical image. Furthermore, the image generated from the feedback provision unit 150 is displayed via a display device along with the currently received medical image. For example, based on the lesion-surrounding area determination unit 130 determining a possibility of a presence of a lesion, the feedback provision unit 150 generates at least one of a visual signal, an audio signal, and a tactile signal to guide a measuring device 110 from a measured location of a currently received medical image toward a direction in which a lesion or another lesion is highly likely to be present.

Furthermore, as illustrated in FIG. 2, the lesion diagnosis apparatus 100 further includes a diagnosis unit 170 and a storage unit 190.

The diagnosis unit 170 is configured to diagnose a lesion from at least one, each, or some of continuous medical images received through the measuring device 110. For example, the diagnosis unit 170 yields diagnosis in real-time by detecting a lesion from at least one, each, or some of continuously-received medical images from the measuring device 110, extracting features from the detected lesion, and classifying the lesions. In one embodiment, the diagnosis unit 170 diagnoses a lesion using a diagnostic model, which is previously generated and stored. In one instance, the diagnostic model is generated by learning from a previously collected medical image. As an example, the diagnosis unit 170 diagnoses a lesion based on all frames of at least one, each, or some of received continuous medical images. As another example, the diagnosis unit 170 diagnoses a lesion by sampling the continuously-received medical images at predetermined or predefined number of frames according to a selection of a user or processing performance. Furthermore, a diagnosis made by the diagnosis unit 170 includes information about whether a lesion is benign or malignant or information about the benignancy or malignancy of a lesion.

In an alternative embodiment, the lesion diagnosis apparatus 100 includes a plurality of diagnosis units 170 that concurrently diagnose a lesion from continuous medical images by performing parallel processing or distributed processing.

In response to the diagnosis unit 170 detecting a lesion, the storage unit 190 stores at least one of location information, features, and diagnosis of the detected lesion. In one example, the features of a detected lesion may include shape features, such as a boundary shape and boundary sharpness, and image features such as an echo pattern and posterior acoustic shadow.

In one embodiment, the diagnosis unit 170 diagnoses a newly detected lesion based on at least one of location information and features of a previously detected lesion. The information and the features are stored in the storage unit 190.

When the measuring device 110 repetitively passes the same region or body part of a patient, the same lesion is repeatedly detected and diagnosed. For this reason, in accord with an embodiment, when a detected lesion is identical to a previously diagnosed lesion and/or when it is determined, based on features of the detected lesion, that the detected lesion is identical to a previously diagnosed lesion, the diagnosis unit 170 does not diagnose the detected lesion. According to an embodiment, a location of a lesion is measured using an accelerometer and a tilt sensor included in the measuring device 100. In addition, when a lesion is detected, is the diagnosis unit 170 may determine whether the detected lesion is identical to a previously diagnosed lesion based on a relative location or absolute coordinates in location information and/or the features of the detected lesion. The location information is stored in the storage unit 190.

Meanwhile, the feedback provision unit 150 generates the feedback information about the diagnosis made by the diagnosis unit 170. As an example, a diagnosis may be generated as an image which indicates information about whether a lesion is malignant or benign or information about the benignancy or malignancy of the lesion. In addition, a diagnosis is displayed via a display device along with the continuously-received medical image.

As alternative embodiment, the diagnosis unit 170 diagnoses a detected lesion although the detected lesion is identical to a previously diagnosed lesion. In addition, when a diagnosis of the detected lesion is different from that of the previously diagnosed lesion, the feedback provision unit 150 generates feedback information indicating the diagnosis of the detected lesion, thereby enabling the user to re-check the detected lesion.

FIGS. 3A to 3D are diagrams illustrating an example of feedback information, according to an embodiment.

Figure 3A:
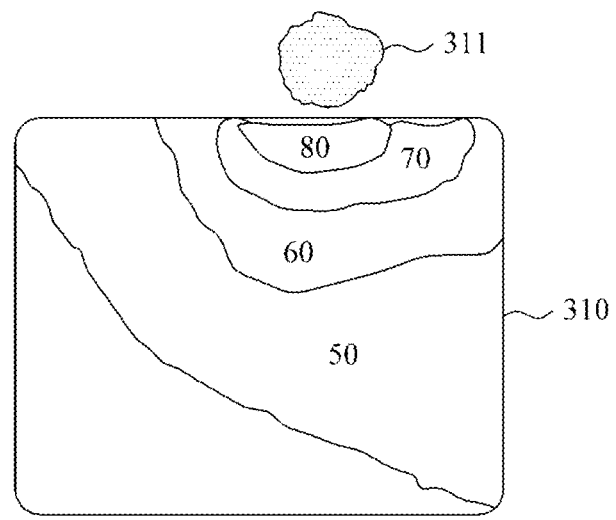
FIGS. 3A to 3D are diagrams illustrating an example of feedback information, according to an embodiment.
Figure 3B:
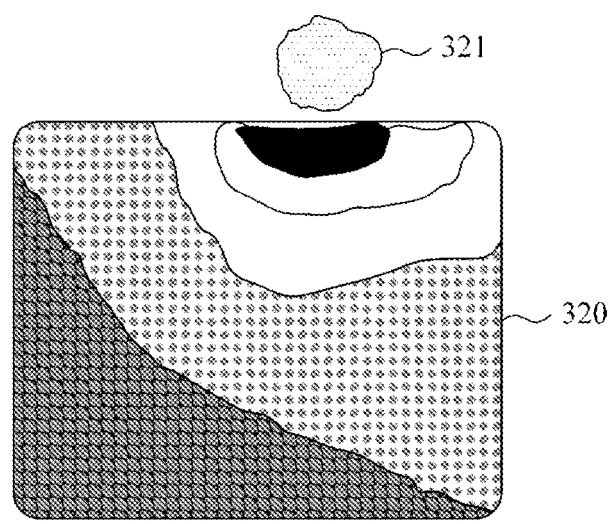

Referring to FIGS. 3A and 3B, the feedback provision unit 150 generates an image indicating a possibility that there is a lesion in at least one, each, or some of currently received medical images 310 and 320, based on the lesion-surrounding area determination unit 130 determining a possibility of a presence of the lesion. According to an embodiment, the image indicating a possibility of a presence of the lesion may be displayed with contour lines. FIGS. 3A and 3B show lesions 311 and 321 present beyond the medical images 310 and 320, respectively. Here, each contour line within the lesions 311 and 321 represents a possibility of a presence of a lesion. In one example, the possibility of the presence of the lesion may be represented as a numerical value that is displayed within a region defined by a contour line, as shown in FIG. 3A, or may be presented by differentiating patterns within contour lines, as shown in FIG. 3B. However, the above is merely an example, and all types of images which are capable of indicating a possibility of a presence of a lesion may be utilized.

Figure 3C:
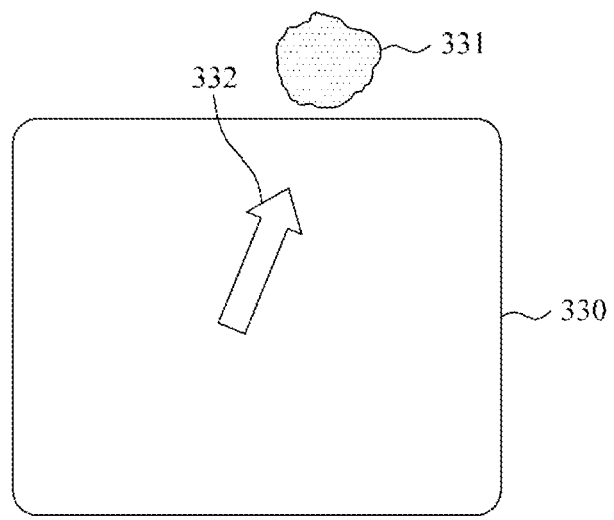

In one embodiment, based on the possibility of a presence of a lesion determined by the lesion-surrounding area determination unit 130, the feedback provision unit 150 generates an image indicating a direction in which a lesion 331 is likely to be present in a currently received medical image 330. In FIG. 3C, an arrow key 332 is used to indicate a direction in which the lesion 331 is highly likely to be present. However, the above is merely an example, and all types of images capable of guiding a moving direction of the measuring device 110 may be utilized.

Figure 3D:
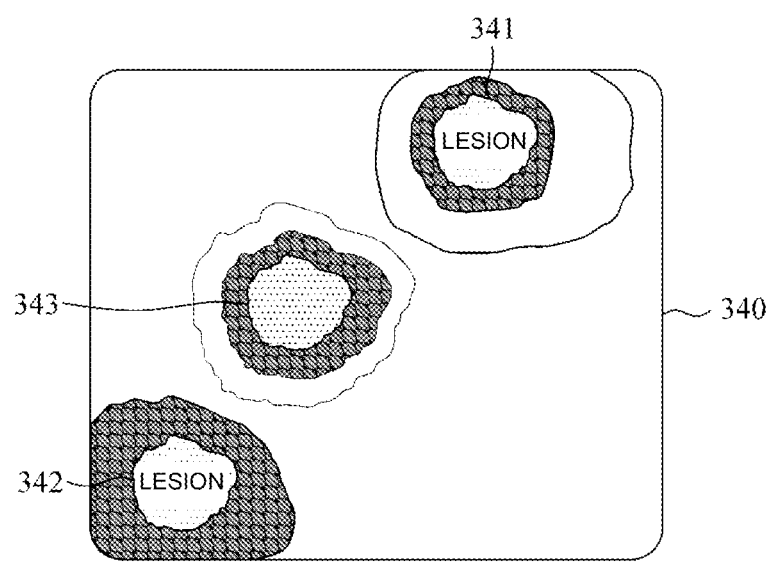

Furthermore, the feedback provision unit 150 generates visual information to notify which lesion has been diagnosed, as illustrated in FIG. 3D. That is, as shown in FIG. 3D, among three lesions 341, 342, 343, which are present in a medical image 340, only the lesions 341 and 342 have been diagnosed. As illustrated in FIG. 3D, it is possible to provide a user with information about which lesion is diagnosed by displaying, for example, a distinct identification number (lesion 1 and lesion 2 in FIG. 3D) along with each of the diagnosed lesions 341 and 342 or by displaying differentiating patterns of the diagnosed lesions 341 and 342.

In addition, based on the lesion-surrounding area determination unit 130 determining the possibility of a presence of a lesion, the feedback provision unit 150 may generate at least one of a visual signal, an audio signal, and a tactile signal to guide the measuring device 110 from a measured location of a currently received medical image toward a direction in which another lesion is highly likely to or possibly be present.

As an example, the feedback provision unit 150 generates a visually recognizable signal based on the possibility of a presence of a lesion determined by the lesion-surrounding area determination unit 130. In one example, the visually recognizable signal may be turning on/off an additionally installed light when a user moves the measuring device 110 toward a direction in which a lesion is highly likely to be present or toward a direction in which a lesion is less likely to be present.

As another example, the feedback provision unit 150 generates a predetermined sound (for example, an alarm or a voice signal) when a user moves the measuring device 110 toward a direction in which a lesion is highly likely to be present or toward a direction in which a lesion is less likely to be present. In addition, the feedback provision unit 150 may change volume of a sound or frequency of a sound when the user moves the measuring device 110 toward a location in which a lesion is highly likely to be present or toward a location in which a lesion is less likely to be present, thereby guiding the measuring device 100 toward a direction in which a lesion is highly likely to be present.

As yet another example, the feedback provision unit 150 generates a vibration in the measuring device 110 when a user moves the measuring device 110 toward a direction in which a lesion is highly likely to be present or a direction in which a lesion is less likely to be present. In addition, the feedback provision unit 150 increases intensity of a vibration when the user moves the measuring device 110 toward a location in which a lesion is highly likely to be present or a location in which a lesion is less likely to be present, thereby guiding the measuring device 110 toward a direction in which a lesion is highly likely to be present.

Furthermore, the feedback information that the feedback provision unit 150 generates is not limited to the above-described embodiments, and feedback information in various forms may be utilized. In addition, the feedback information may be at least one of a visual signal, an audio signal, and a tactile signal.

The units and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

Figure 4:
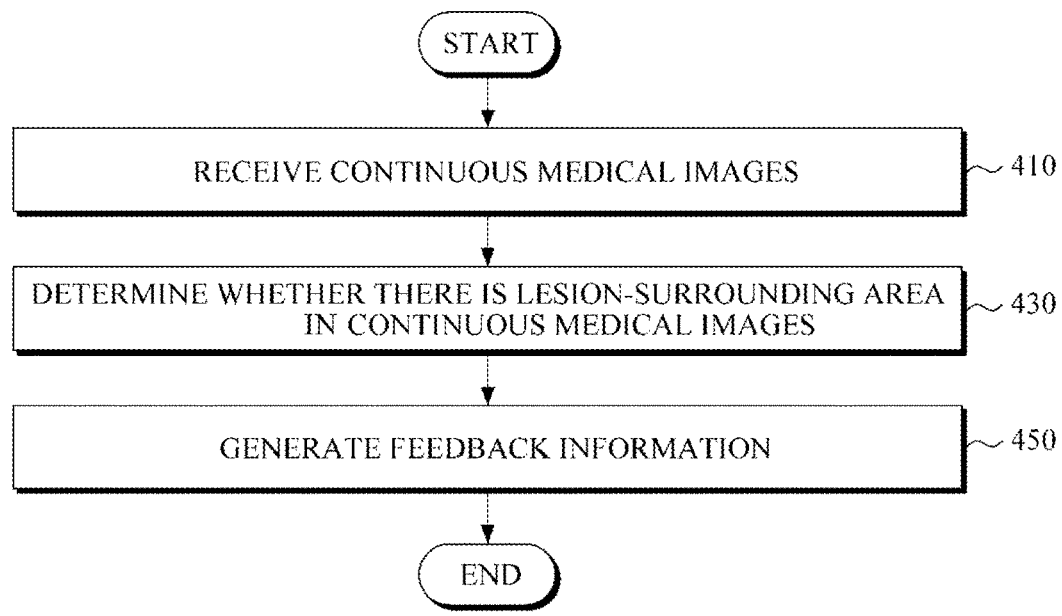
FIG. 4 is a flow chart illustrating a procedure to determine a lesion-surrounding area, according to an embodiment.

FIG. 4 is a flow chart illustrating a procedure to determine a lesion-surrounding area, according to an embodiment.

Referring to FIG. 4, at operation 410, the method at the lesion diagnosis apparatus 100 continuously receives medical images through a measuring device 100 and, at operation 430, determines whether a lesion-surrounding area exists in at least one, each, or some of the continuous medical images.

In one embodiment, the determination as to whether there is a lesion-surrounding area in a medical image may be made in real-time based on at least one of anatomical features and image features of the medical image. In one example, the anatomical features may relate to skin, fat, and breast parenchyma. In addition, the image features may include an image feature that is determined according to the distance from the lesion, such as variation in brightness of the medical image as a function of the distance from the lesion. However, the present configurations are not limited thereto, and various other types of information that are found largely nearby a lesion may be utilized.

In one embodiment, the determination of whether there is a lesion-surrounding area in the medical image may be made using a discriminant model that is previously generated and stored. In one example, the discriminant model is generated by learning at least one of anatomical features and image features of a lesion-surrounding area included in a previously collected medical image.

In one embodiment, the determination of whether a lesion-surrounding area is present in the medical image may include the possibility of a presence of the lesion according to a measured location of the medical image. For example, when using the discriminant model, which utilizes surrounding brightness of a lesion, a possibility of a presence of the lesion may be obtained as a numerical value by comparing a variation in brightness of a currently received medical image against the brightness of the discriminant model.

In one embodiment, the determination of whether there is a lesion-surrounding area is made with respect to all frames of each of the received continuous medical images, with respect to one or some of the frames of each of the received continuous medical images, or with respect to one, some, or all of the frames of at least one of the received medical image.

In another embodiment, the determination of whether there is a lesion-surrounding area may be made by sampling at least one, each, or some of the continuous medical images at predetermined number of frames according to a selection of a user or processing performance.

In addition, at operation 450, the method of the lesion diagnosis apparatus 100 generates feedback information based on the decision as to whether there is a lesion-surrounding area to provide the user with information about whether there is a lesion-surrounding area. In one instance, the feedback information is generated as an image that indicates a possibility of a presence of the lesion according to a measured location the received medical image. In addition, the feedback information may include at least one of a visual signal, an audio signal, and a tactile signal to guide the measuring device 110 from a measured location of a currently received medical image toward a direction in which a lesion is highly likely to be present.

Figure 5:
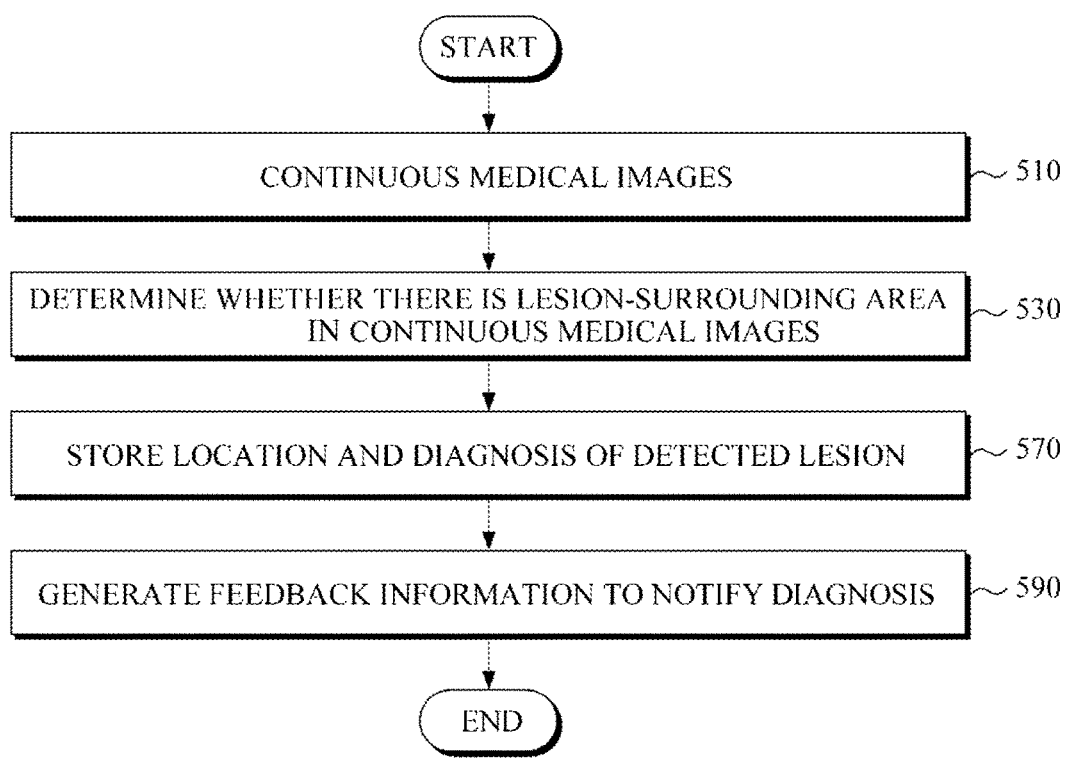
FIG. 5 is a flow chart illustrating a procedure to diagnose a lesion, according to an embodiment.

FIG. 5 is a flow chart illustrating a procedure or a method to diagnose a lesion, according to an embodiment.

Referring to FIG. 5, at operation 510, the method of a lesion diagnosis apparatus 100 receives continuous medical images through a measuring device 110. At operation 530, the method diagnoses a lesion from at least one, each, or some of the continuous medical images.

Diagnosing of a lesion may be performed in real-time by detecting the lesion from at least one, each, or some of the continuous medical images, extracting features from the detected lesion, and classifying the lesions.

In one example, diagnosing of the lesion may be performed using a diagnostic model, which was previously generated and stored. The diagnostic model may be generated by learning from a previously collected medical image.

Diagnosing of a lesion may be performed on at least one, some, or all frames of each of the continuous medical images.

Alternatively, diagnosing of a lesion may be performed by sampling at least one, each, or some of the continuous medical images at predetermined number of frames according to a selection of a user or processing performance.

In addition, in response to the lesion being detected from the continuous medical images received through the measuring device 110, at operation 570, at least one of location information, features, and a diagnosis of the detected lesion are stored. In one example, the location information of the detected lesion is measured using an accelerometer and a tilt sensor in the measuring device 110.

Also, diagnosing the lesion that has not been diagnosed may be performed using at least one of the location information and the features that are stored with respect to the detected lesion. For example, when a lesion is detected from a medical image, it is possible to determine whether the detected lesion is identical to a previously diagnosed lesion based on a relative location or absolute coordinates in location information that is stored with respect to the detected lesion. As another example, whether a detected lesion is identical to a previously diagnosed lesion may be determined by comparing features of the detected lesion with those of the previously diagnosed lesion.

At operation 590, the method provides in real-time the diagnostics of a lesion detected from continuous medical images. For example, the diagnosis may be generated as an image indicating whether the detected lesion is benign or malignant or an image indicating the benignancy or malignancy of the detected lesion. In addition, the diagnosis may be displayed through a display device along with a medical image from which the lesion is detected.

In one example, when the detected lesion is identical to a previously diagnosed lesion, the method provides the user with diagnostics of the detected lesion when the diagnosis of the detected lesion is different from that of the previously diagnosed lesion, thereby allowing a user to reconfirm the detected lesion.

As a result of the descriptions provided above, it is possible to provide a user with information about a lesion located beyond a medical image that is currently received through a measuring device, thereby enhancing accuracy in diagnosis. A medical image is able to be analyzed in real time and the analytical result is notified to a user so that a lesion may be prevented from being omitted and the user's convenience may be improved. Furthermore, if there are multiple lesions, a lesion that has been diagnosed can be displayed in a distinguishing manner from a lesion that has not been diagnosed, thereby making a diagnosing process fast.

Program instructions to perform the methods of FIGS. 4 and 5 described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A lesion diagnosis apparatus comprising:
at least one display;
at least one memory, configured to store one or more programs; and
at least one processor that, upon execution of the one or more programs, is configured to:
receive continuous medical images,
determine whether at least one lesion-surrounding area exists in a medical image that is currently displayed on the at least one display,
determine a possibility of a presence of a lesion outside the currently displayed medical image based on the at least one lesion-surrounding area,
generate, when the possibility of the presence of the lesion exists, at least one directional image indicating an outside direction of the medical image in which the lesion is likely to be present,
display the at least one directional image on the currently displayed medical image, and
diagnose the lesion from each of the continuous medical images,
wherein the at least one memory is further configured to store at least one of location information, features or diagnosis of the lesion diagnosed, and
wherein the at least one processor is further configured to:
determine whether the lesion is substantially identical to a previously diagnosed lesion based on at least one of a relative location or absolute coordinates of location information of the lesion or features of the lesion, and
when the lesion is substantially identical to the previously diagnosed lesion, exclude diagnosing the lesion.

2. The lesion diagnosis apparatus of claim 1, wherein the at least one processor is further configured to determine the existence of the lesion-surrounding area from each of the continuous medical images.

3. The lesion diagnosis apparatus of claim 1, wherein the at least one processor is further configured to determine the lesion-surrounding area from the continuous medical images using a discriminant model.

4. The lesion diagnosis apparatus of claim 3, wherein the discriminant model is generated by learning at least one of anatomical features or image features of a previously collected lesion-surrounding area.

5. The lesion diagnosis apparatus of claim 1, wherein the at least one processor is further configured to determine whether there is a lesion-surrounding area by:
analyzing each frame of the continuously-received medical images, or
sampling each of the continuously-received medical images every number of frames according to a selection of a user or a processing performance.

6. The lesion diagnosis apparatus of claim 3, wherein the at least one processor is further configured to determine the possibility of the presence of the lesion as a numerical value by comparing a brightness variation of each medical image of the continuous medical images against the discriminant model.

7. The lesion diagnosis apparatus of claim 1, wherein the at least one processor is further configured to determine the possibility of the presence of the lesion in the lesion-surrounding area from the continuous medical images according to a measured location of a medical image.

8. The lesion diagnosis apparatus of claim 1, wherein the at least one processor is further configured to generate, based on the possibility of the presence of the lesion, an image in the form of a probability map indicating the possibility of the presence of the lesion.

9. The lesion diagnosis apparatus of claim 1, wherein the at least one processor is further configured to generate at least one of a visual signal, an audio signal, or a tactile signal to guide a measuring device toward the outside direction of the medical image in which the lesion is likely to be present.

10. The lesion diagnosis apparatus of claim 1,
wherein the at least one processor is further configured to generate a feedback information to output the diagnosis of the diagnosed lesion.

11. The lesion diagnosis apparatus of claim 10, wherein the at least one processor is further configured to generate, based on at least one of the location information, the features, or the diagnosis, visual information to notify that the lesion has been diagnosed.

12. The lesion diagnosis apparatus of claim 11, wherein the at least one processor is further configured to diagnose, based on at least one of the location information or the features, an undiagnosed lesion.

13. The lesion diagnosis apparatus of claim 10, wherein the at least one processor is further configured to diagnose in real-time by:
detecting a lesion from at least one of or each of the continuously-received medical images,
extracting features from the detected lesion, and
classifying the detected lesion.

14. The lesion diagnosis apparatus of claim 10, wherein the at least one processor is further configured to diagnose the lesion based on all frames of each of the continuous medical images or based on sampling the continuously-received medical images at predefined number of frames.

15. The lesion diagnosis apparatus of claim 1,
wherein the features of the lesion comprise a boundary shape and boundary sharpness, an echo pattern, and posterior acoustic shadow.

16. A lesion diagnosis method comprising:
at a lesion diagnosis apparatus with at least one display, at least one memory for storing one or more programs, and at least one processor for execution of the one or more programs,
receiving, by the at least one processor, continuous medical images;
determining, by the at least one processor, whether at least one lesion-surrounding area exists in a medical image that is currently displayed on the at least one display;
generating, by the at least one processor, feedback information about a presence of a lesion in the at least one lesion-surrounding area;

diagnosing the lesion from each of the continuous medical images;

storing in the at least one memory, at least one of location information, features or diagnosis of the diagnosed lesion;

determining whether the lesion is substantially identical to a previously diagnosed lesion based on at least one of a relative location or absolute coordinates of location information of the lesion or features of the lesion; and excluding, when the lesion is substantially identical to the previously diagnosed lesion, diagnosing the lesion, wherein the generating of the feedback information comprises:

determining a possibility of the presence of the lesion outside the currently displayed medical image based on the at least one lesion-surrounding area, generating, when the possibility of the presence of the lesion exists, at least one directional image indicating an outside direction of the medical image in which the lesion is likely to be present, and displaying the at least one directional image on the currently displayed medical image.

17. The lesion diagnosis method of claim 16, wherein the determining of the existence of the lesion-surrounding area comprises determining the existence of the lesion-surrounding area from each of the continuous medical images.

18. The lesion diagnosis method of claim 16, wherein the determining of the existence of the lesion-surrounding area comprises determining the lesion-surrounding area using a discriminant model.

19. The lesion diagnosis method of claim 18, further comprising:

generating the discriminant model by learning at least one of anatomical features or image features of a previously collected lesion-surrounding area.

20. The lesion diagnosis method of claim 16, wherein the determining of the existence of the lesion-surrounding area comprises determining the possibility of the presence of the lesion in the lesion-surrounding area from the continuous medical images according to a measured location of the medical image.

21. The lesion diagnosis method of claim 16, further comprising generating, based on the possibility of the presence of the lesion, an image in a form of a probability map indicating the possibility of the presence of the lesion.

22. The lesion diagnosis method of claim 16, wherein the generating of the directional image indicating the outside direction of the medical image in which the lesion is likely to be present comprises, based on the possibility of the presence of the lesion, generating at least one of a visual signal, an audio signal, or a tactile signal to guide a measuring device toward a direction in which the lesion is likely to be present.

23. The lesion diagnosis method of claim 16, further comprising:

generating the feedback information to output the diagnosis of the diagnosed lesion.

24. The lesion diagnosis method of claim 23, wherein the generating of the feedback information further comprises, based on at least one of the location information or the features, generating visual information to notify that the lesion has been diagnosed.

25. The lesion diagnosis method of claim 24, wherein the diagnosing of a lesion comprises diagnosing, based on at least one of the location information or the features, an undiagnosed lesion.

* * * * *